United States Patent
Borkovic et al.

(10) Patent No.: US 6,452,937 B1
(45) Date of Patent: Sep. 17, 2002

(54) CARD-BASED VOICE MESSAGING SYSTEM

(75) Inventors: Lee Edward Borkovic, Long Branch; Edmund Thomas Burke, West Long Branch; Robert Cochran, Matawan; Thomas Mark Grill, Perth Amboy; Everett R. Johnson, Jr., Holmdel; Michael Stephen Lane, Keyport; Basheer M. Tannu, Tinton Falls; Gary N. Weber, Fair Haven, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/151,636

(22) Filed: Sep. 11, 1998

(51) Int. Cl.[7] .............................................. H04B 7/212
(52) U.S. Cl. ...................... 370/442; 455/412; 455/413; 370/259
(58) Field of Search ................................. 370/259, 260, 370/261, 378, 442, 346, 349; 455/412, 413, 414, 550, 552, 557, 556, 563; 375/219, 272; 379/93.01, 93.05, 93.24, 90.01; 704/200

(56) References Cited

U.S. PATENT DOCUMENTS

| | | | | |
|---|---|---|---|---|
| 5,457,782 A | * | 10/1995 | Daly | 704/200 |
| 5,859,628 A | * | 1/1999 | Ross | 340/990 |
| 6,009,151 A | * | 12/1999 | Staples | 379/90.01 |
| 6,122,216 A | * | 9/2000 | Dykes | 365/230.03 |
| 6,161,007 A | * | 12/2000 | McCutcheon | 455/412 |

OTHER PUBLICATIONS

Partner II Telephone System, Communications Technology Made Simple, Lucent Technologies, 4 pages, Dec. 1997.
The Voice Processing Glossary, Dialogic Corp., pp. 1–52, 1990.
Voice Messaging, Meridian Mail Compact Option User Guide, Nortel (Northern Telecom), 16 pages, Nov. 1997.

(List continued on next page.)

Primary Examiner—Douglas Olms
Assistant Examiner—Ricardo M. Pizarro
(74) Attorney, Agent, or Firm—Ryan, Mason & Lewis, LLP

(57) ABSTRACT

A voice messaging system is implemented using a PCMCIA card or other type of card, and a host call processing device such as a PBX switch. The card includes a processor operative to implement various voice messaging system functions, and a memory for storing voice data used in the voice messaging system. The host call processing device has a socket adapted to receive the card. The card receives voice data from the host call processing device for storage in the memory, and delivers voice data retrieved from the memory to the host call processing device. The voice data is communicated between the card and the host over a custom serial bus which includes a time-division multiplexed voice data line divided into a plurality of time slots, each of the time slots providing a distinct voice data channel at a designated bit rate. The serial bus is configured to include a multiplexer which allows the data to be transferred over address lines of a standard PCMCIA interface between the card and the host call processing device. The card-based voice messaging system also provides features such as dynamic memory allocation, which allows a user to select the number of voice mail boxes supported by the system and the amount of memory allocated to each of the mail boxes, and language selection, which allows a user to select one of a set of languages that are supported by the card-based voice messaging system, with the memory used for unselected languages automatically re-allocated for use as voice mail box storage.

28 Claims, 5 Drawing Sheets

OTHER PUBLICATIONS

Partner Mail VS® System, Lucent Technologies, 1998.
Mitel Mail, Powerful Voice Mail and Messaging Solutions for Enterprises with Mitel PBXs, Mitel Corp., 8 pages, 1998.
Introducing The Voice Wizard, The New Voice for Small Business, VoiceGate Corp., 2 pages, 1998.
Key Voice® Product Specifications, Key Voice Technologies, Inc., 3 pages, 1997.
Key Voice®Product Feature Overview, Key Voice Technologies, Inc., pp. 1–8, 1997.
VoiceGate–Unlocks the Hidden Profit in your Business Phone System, VoiceGate Corp., 4 pages, undated.
DKTS plus VM Voice Mail, Sun Moon Star Group, 2 pages, Dec. 1989.
ITT PBXpress™, ITT Business Communications Corporation, 2 pages undated.
Max Receptionist™, ETC Audichron Digicept, Electronic Tele–Communications, Inc., 6 pages, Nov. 1991.
A Sound Foundation, Octel Communications Corp., 12 pages, Apr. 1990.
Premier® Expression™ Product Information, Premier Telecom Products, Inc., 2 pages, 1988.
System 1003, Automated Answering Voice Messaging Call Accounting, TIE Communications, Inc., 2 pages, Aug. 1988.
Centigram VoiceMemo–VS™, Centigram Corp., 4 pages, Aug. 1988.
The Voice Retrieval System, pp. 1–8, BBL Industries Inc., undated.
COMPACT, Voice Processing System, Boston Technology, 2 pages, Sep. 1989.
INTOUCH Digital Voice Messaging System, Toshiba America, Inc., Telecommunication Systems Division, 2 pages, 1988.
ISOETEC/IVIE, ISOETEC Communications, Inc., 2 pages, Dec. 1987.
Seamlessly Superior™ Integrations for Meridian Norstar, VoiceGate Lite Series, VoiceGate Corporation, 4 pages, undated.

* cited by examiner

CARD-BASED VOICE MESSAGING SYSTEM

FIELD OF THE INVENTION

The present invention relates generally to communication systems and more particularly to voice messaging systems for use in communication switches or other types of call processing devices.

BACKGROUND OF THE INVENTION

Many different types of switches or other call processing devices incorporate voice messaging capabilities. For example, private branch exchange (PBX) switches may be configured to provide such capabilities. The voice messaging systems implemented in these and other types of call processing devices are often designed to utilize two separate processors. In a typical arrangement, one of the processors is used for applications execution and file system management, while the other processor is used to implement signal processing functions, such as, for example, voice coding, tone detection and tone generation. A hard drive is generally used for storing compressed voice data files, such as voice messaging system prompts and recorded voice messages.

A significant problem with these and other conventional voice messaging systems is that the two separate processors and the hard drive generally must be built into the same call processing device, which unduly increases the cost and complexity of the device. In addition, there is generally no mechanism provided for allowing a user to add or drop easily the voice messaging capability of a given call processing device once that device has been purchased and installed. Similar factors can render the device hardware difficult to upgrade to reflect improvements in memory and processing capabilities, without replacing the entire device.

Another approach which has been used to provide voice messaging capability in a call processing device is simply to plug a conventional answering machine into a device which has no built-in voice messaging capability. Although this can overcome some of the problems associated with integrating a voice messaging system into the call processing device, conventional answering machines are generally unable to provide the more sophisticated features commonly associated with integrated voice messaging systems.

A need therefore exists for an improved voice messaging system which provides a substantially more flexible implementation than the above-noted conventional approaches, and which can operate with a wide variety of different types of call processing devices.

SUMMARY OF THE INVENTION

The invention provides a voice messaging system implemented at least in part using a card, such as a card configured in accordance with the Personal Computer Memory Card International Association (PCMCIA) standard, which can be inserted in a socket in a private branch exchange (PBX) switch or other type of call processing device. The card includes a processor operative to implement various voice messaging system functions, and a memory for storing voice data used in the voice messaging system. The card processor may be used to perform signal processing, application execution and file system management functions of the voice messaging system. The host call processing device has a socket adapted to receive the card. The card receives voice data from the host call processing device for storage in the memory, and delivers voice data retrieved from the memory to the host call processing device.

In accordance with another aspect of the invention, voice data is communicated between the card and the host over a custom full duplex serial bus which includes input and output time division multiplexed voice data lines, each divided into a plurality of time slots, with each of the time slots providing a distinct voice data channel at a designated bit rate. For example, the serial bus may operate at a clock rate of about 2 MHz, with the time-division multiplexed voice data lines each including 32 time slots, each with a bit rate of about 64 kbps. The serial bus may be configured to include a multiplexer which allows the voice data to be transferred over address lines of a standard PCMCIA interface between the card and the host call processing device.

A card-based voice messaging system in accordance with the invention can be used to implement additional features such as dynamic allocation of voice mail boxes and dynamic language selection. For example, the card processor can implement a memory allocation function which allows a user to define the number of voice mail boxes supported by the voice messaging system, and/or the amount of memory which is allocated to each of the mail boxes. The processor can also implement a language selection function which allows a user to select one of a set of languages that are supported by the card-based voice messaging system. In this case, the card memory can store information in each of the set of languages, and when the user selects a given one of the languages, the portion of the memory that contains information in the unselected languages can be automatically re-allocated for use as voice mail box storage.

The present invention provides a substantially more flexible voice messaging system implementation than conventional systems, and can operate with a wide variety of different types of call processing devices. The invention significantly reduces the cost and complexity of voice messaging systems, allows simple installation and removal of a given system in a call processing device, while also providing more reliable and efficient voice data transport than conventional voice messaging systems. In addition, the invention allows a user to dynamically allocate storage to their particular needs without purchasing additional memory or software upgrades. These and other features and advantages of the present invention will become more apparent from the accompanying drawings and the following detailed description.

DETAILED DESCRIPTION OF THE INVENTION

Although the invention will be illustrated below in conjunction with the processing of calls in an exemplary PBXlike communications switch, it is not limited to use with any particular type of switch or call processing device. For example, the disclosed techniques can be used with automatic call distribution (ACD) systems, telemarketing systems, computer-telephony integration (CTI)-based systems, as well as in combinations of these and other types of systems and devices. The term "call processing device" as used herein is thus intended to include any type of communication switch, PBX, ACD system, telemarketing system or other communication system device which processes calls or other service requests, including voice calls, video calls, multimedia calls, e-mail, faxes, voice messages or paging massages as well as various combinations of these and other types of communications. The term "card" as used herein is intended to include not only PCMCIA cards, but also other types of plug-in cards or modules suitable for providing one or more voice messaging functions in a call processing device.

Figure 1:
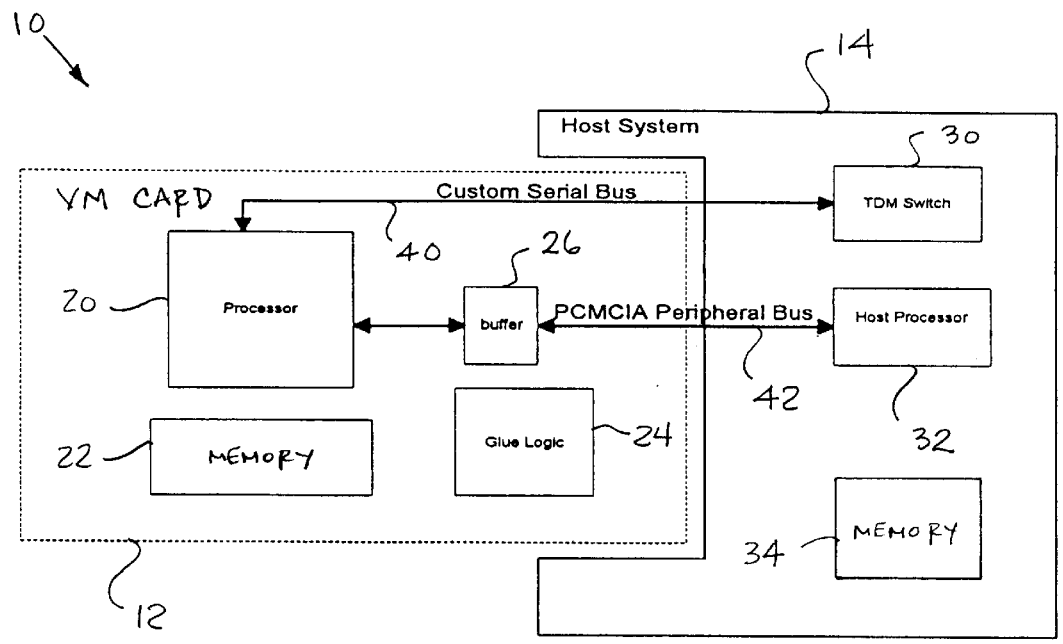
FIG. 1 is a block diagram of a card-based voice messaging system in accordance with an illustrative embodiment of the invention.

FIG. 1 shows a card-based voice messaging system 10 in accordance with an illustrative embodiment of the invention. The system 10 includes a voice messaging (VM) card 12 and a host system 14. The VM card 12 in this embodiment is assumed to be a PCMCIA card configured in accordance with the PCMCIA standard as described in, for example, PCMCIA Standard, Volumes 1 and 2, Personal Computer Memory Card International Association, February 1995, which is incorporated by reference herein. The VM card 12 plugs into a corresponding PCMCIA socket in the host system 14. The VM card 12 includes a processor 20, a memory 22, a set of glue logic 24, and a buffer 26. The host system 14 includes a time division multiplexed (TDM) switch 30, a host processor 32 and a memory 34. One or both of the processors 20 and 32 may be implemented as a microprocessor, an application-specific integrated circuit (ASIC), a digital signal processor, and various portions or combinations of these and other data processing devices. For example, the processor 20 of VM card 12 may be an ASIC which incorporates a DSP1627 core from Lucent Technologies Inc. The glue logic 24 represents supporting logic circuitry which may operate, e.g., in conjunction with signals from processor 20 and memory 22 to implement various functions on the VM card 12.

The processor 20 of VM card 12 communicates with the TDM switch 30 of host system 14 via a custom serial bus 40 which will be described in greater detail below. The host processor 32 communicates with the processor 20 via PCMCIA peripheral bus 42 and buffer 26. The custom serial bus 40 is designed to overcome limitations inherent in the PCMCIA parallel data bus with regard to transfer of synchronous voice data. For example, using the PCMCIA parallel data bus to carry synchronous voice data at 64 kbps/channel would tend to overload the host processor 32 with interrupts for servicing the synchronous data. The serial bus 40 utilizes data input (DI), data output (DO), frame clock and data clock signals for voice messaging functions, and these signals are multiplexed with other PCMCIA signals, e.g., PCMCIA address bits, that are not used for the voice messaging application. In this embodiment, the serial bus 40 is full duplex and connects directly to the VM card processor 20 as shown in FIG. 1. The serial bus 40 is completely independent of the PCMCIA peripheral bus 42 and has no interaction with the host processor 32. However, the peripheral bus 42 is still used to pass control messages between the host processor 32 and the processor 20. Of course, numerous other configurations of the serial bus 40 can be used in alternative embodiments of the invention.

In accordance with the invention, the processor 20 of VM card 12 may be used to implement system functions including signal processing, application execution and file system management. This is in contrast to conventional voice messaging systems, in which two separate processors are generally used to implement these functions. The processor 20 can support these multiple functions by, e.g., dividing its bandwidth between signal processing and applications processing using a multi-tasking approach. In addition, unlike a conventional voice messaging system which generally utilizes a hard drive for voice data storage, the VM card 12 in the illustrative embodiment uses an electronic memory 22 for voice data storage. It should be noted that the VM card 12 is capable of, e.g., going on-hook and off-hook, detecting dial tone indications from the host system, initiating calls in response to dial tone indications, answering calls sent from the host system, initiating call transfers based on caller selections, terminating calls, and otherwise performing operations typically performed by conventional voice messaging systems. Such operations are well understood in the art and will therefore not be described in detail herein.

Figure 2:
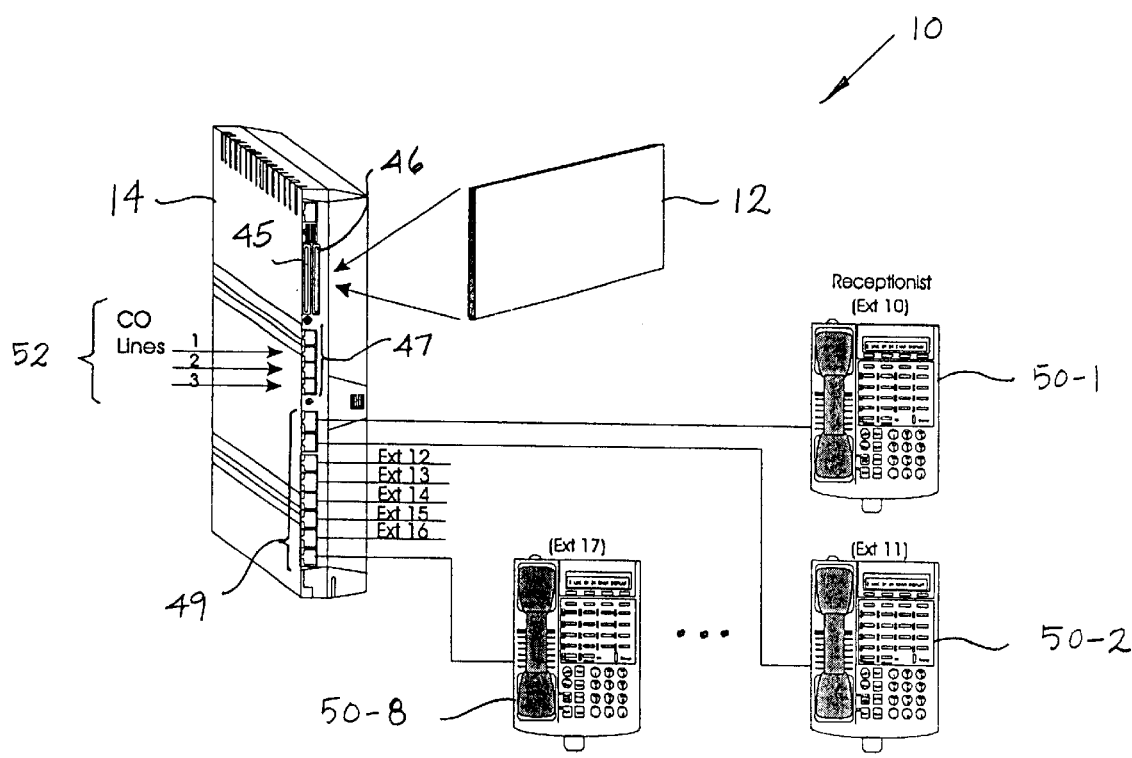
FIG. 2 is a perspective view of one possible implementation of the card-based voice messaging system of FIG. 1.

FIG. 2 shows one possible implementation of the card-based voice messaging system 10 of FIG. 1. In this implementation, the host system 14 is a PBX system similar to the PARTNER™ Advanced Communication System (ACS) Key/Hybrid PBX System available from Lucent Technologies Inc. The host system 14 includes a pair of PCMCIA sockets 45, 46, one or both of which may be adapted to receive the VM card 12 as shown. The PCMCIA standard defines a 68-pin interface between a peripheral card and the corresponding card socket of the host system. The standard also defines three different form factors, referred to as Type I, Type II and Type III. For each of the factors, the card width and length is the same, roughly the size of a credit card, but the card thickness is different. Although the invention can be implemented using any of the different form factors, it will be assumed for purposes of illustration that the VM card 12 is implemented using a Type II form factor. The system 14 could utilize a single VM card in one of the sockets 45, 46, with the other socket used for another type of PCMCIA card. In an alternative embodiment of the invention, the system 14 could utilize two VM cards simultaneously, one in each of the PCMCIA sockets 45, 46, in order to provide increased voice messaging capability relative to that provided by a single card. Another possible technique for increasing the capabilities of, e.g., a single card system, is to add a backplane and other circuitry to the system in a conventional manner.

The host system 14 as shown in FIG. 2 also includes a set of central office (CO) trunk line ports 47, a set of eight telephone line ports 49, and a set of telephones 50-1, 50-2, . . . 50-8. The ports 47 provide connections for incoming CO trunk lines 52, while the ports 49 are used to provide connections between the system 14 and a set of extensions 10, 11, . . . 17 corresponding to the telephones 50-1, 50-2, . . . 50-8, respectively. System 14 in this embodiment thus serves as a PBX switch for directing calls between one or more COs of a public-switched telephone network (PSTN), and one or more of the telephones 50-1, 50-2, . . . 50-8. This implementation is well suited for use as a business telephone system in which one of the telephones, e.g., telephone 50-1, is assigned to a receptionist, and the remaining telephones are assigned to various employees. The VM card 12 in accordance with the invention allows the system 14 to provide not only basic voice messaging service, but also other features such as after-hours answering and receptionist back-up. Call handling interactions between the VM card 12 and the host system 14 will be described in greater detail in conjunction with the state diagram of FIG. 7.

Figure 3:
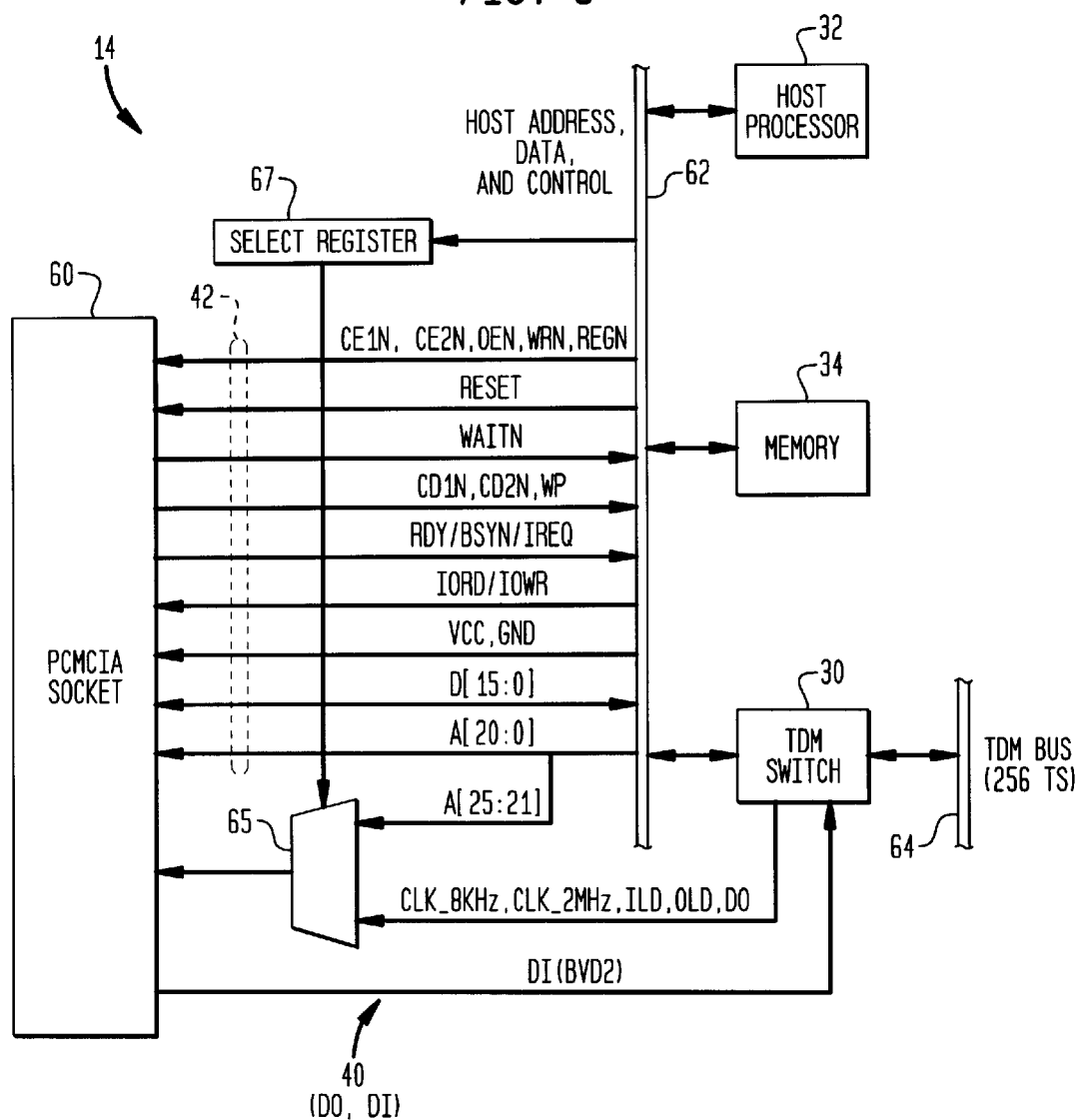
FIG. 3 is a block diagram illustrating the host system portion of the card-based voice messaging system of FIG. 1 in greater detail.

FIG. 3 is a block diagram illustrating a portion of the host system 14 of the card-based voice messaging system 10 of FIG. 1 in greater detail. The host system 14 in this embodiment includes time division multiplexed (TDM) switch 30, host processor 32 and memory 34 as previously described. The switch 30, host processor 32 and memory 34 communicate within system 14 over a host address, data and control bus 62. The TDM switch 30 receives voice data via a TDM bus 64. The TDM bus 64 represents the main bus for the system 14, and includes time slots for tones, calls, etc. The system 14 also includes a PCMCIA socket 60 which is configured in accordance with the PCMCIA standard to accept a PCMCIA card. The PCMCIA peripheral bus 42 includes address signal lines A[20:0], data signal lines D[15:0], supply voltage and ground lines VCC and GND, respectively, input/output read and write lines IORD and IOWR, respectively, a ready/busy not/interrupt signal line RDY/BSYN/IREQ, card detect signal lines CD1N and CD2N, a write protect signal line WP, an extended bus cycle line WAITN, a card reset line RESET, card enable lines CE1N and CE2N, an output enable line OEN, a write enable line WRN and a register select line REGN. These are conventional PCMCIA signal lines which are described in detail in the above-cited PCMCIA standard, and will therefore not be further described herein.

The serial bus 40 includes a DI signal line coupled from the BVD2 pin of the PCMCIA socket 60 to the TDM switch 30, and a DO signal line which can be controllably coupled from the TDM switch 30 to the PCMCIA socket 60 via a multiplexer 65. The serial bus 40 also includes a set of additional signal lines, including CLK_2 MHZ, CLK_8 KHZ, ILD and OLD signal lines. The signal CLK_2 MHZ represents the data clock, which this embodiment will be assumed to have a rate of 2.048 MHz, while the signal CK_8 KHZ is the voice frame clock, which will be assumed to have a rate of 8 KHz. The signals ILD and OLD are input load and output load signals, respectively. As previously noted, signals DI and DO represent data input, i.e., from card to socket, and data output, i.e., from socket to card, respectively.

The system 14 further includes a select register 67. The multiplexer 65 receives as a select signal input the contents of the select register 67. Based on the contents of select register 67, the multiplexer 65 delivers either the five uppermost PCMCIA address bits A[25:21] or the five signal lines CLK_2 MHZ, CLK_8 KHZ, ILD, OLD and DO to the PCMCIA socket 60. The contents of the select register 67, and thus the state of the multiplexer 65, can be controlled by the host processor 32. The host processor 32 controls the state of the multiplexer 65 based on a determination of the type of card inserted in the PCMCIA socket. Any given card inserted in the socket carries a unique signature in its addressable memory which identifies the type of card that it is, e.g., whether it is a VM card or some other type of PCMCIA card. The serial bus 40 in this embodiment is thus made possible by multiplexing the output lines from TDM switch 30 with designated PCMCIA address signal lines.

The TDM switch 30 within system 14 interfaces with the VM card 12 via the serial bus 40. As previously noted, the data clock rate of serial bus 40 is 2.048 MHz, which provides a 64 kbps channel, i.e., 8 bits at 8 kHz, for each of 32 8-bit time slots (TSs), e.g., time slots TS0 through TS31, at the assumed voice frame rate of 8 KHz (32 time slots×8 bits×8 KHz frame rate=2.048 MHz data clock rate). Two of the 32 time slots, e.g., TS27 and TS29, are used for transmitting and receiving voice samples to provide record and playback features. In-band tones for signaling, e.g., DTMF tones coded in digital form, may also be carried on the serial bus 40. For example, such tones may be used to deliver appropriate mode codes to the VM card 12 from the host system 14 at the beginning of each call, or to provide information such as terminal message LED activation from the VM card 12 to the host system 14. Additional details regarding mode codes can be found in, e.g., U.S. Pat. No. 4,879,743, issued Nov. 7, 1989 to Edmund T. Burke et al. and entitled "PBX and adjunct using multi-frequency tones for communication therebetween," which is incorporated by reference herein.

Figure 4:
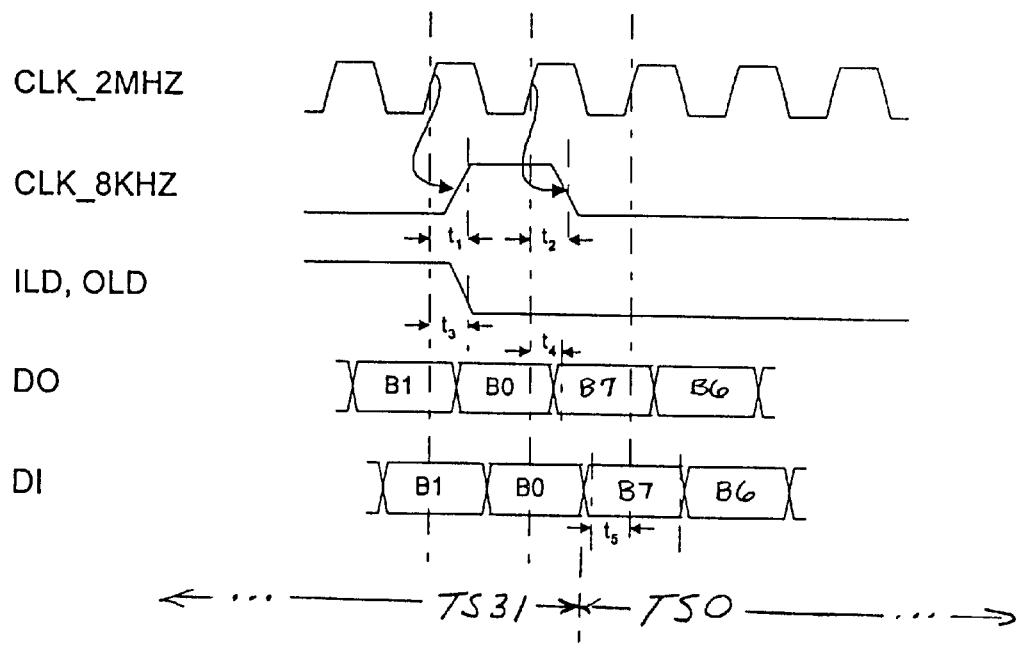
FIGS. 4 and 5 are timing diagrams illustrating voice data transfer operations in the card-based voice messaging system of FIG. 1.
Figure 5:
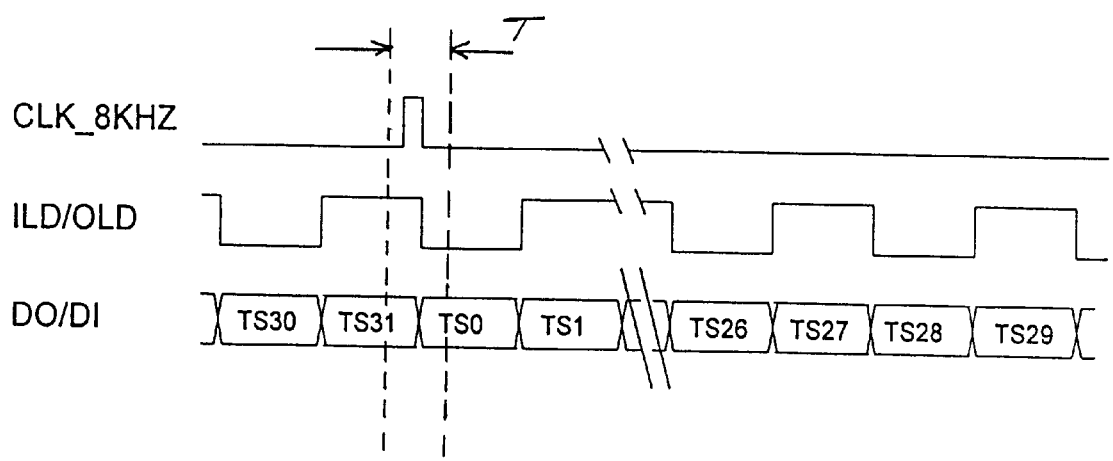

FIGS. 4 and 5 are timing diagrams illustrating data transfer operations in the card-based voice messaging system of FIG. 1. FIG. 4 represents an expansion of the time interval T defined by the dashed horizontal lines in FIG. 5, and shows the relationship between transition edges in the signals CLK_2 MHZ, CLK_8 KHZ, ILD, OLD, DO and DI. The 2.048 MHz CLK_2 MHZ signal serves as the data clock and as a reference for the other signals. The 8 KHz frame signal CLK_8 KHz is derived from the CLK_2 MHZ signal by dividing the latter by a factor of 256. The CLK_8 KHz signal is asserted once every 125 microseconds and then negated on the subsequent rising edge of the CLK_2 MHz signal. The input load and output load signals ILD and OLD, respectively, are generated from a common source in the TDM switch 30. The designation Bn in the timing diagram refers to a particular bit in a given 8-bit time slot. For example, B7 may be the first bit of a "most-significant-bit-first" time slot. The assertion of ILD, which is active low, indicates that the first bit of a 8-bit sample will be clocked into the TDM switch 30 on the second rising edge of CLK_2 MHZ following ILD. The VM card 12 can use this signal to drive a new sample onto the DI signal line after the first rising edge of CLK_2 MHZ when ILD is asserted. The assertion of OLD, which is also active low, indicates that the first bit of a 8-bit sample will be clocked out of the TDM switch on the next rising edge of CLK_2 MHZ following OLD. Exemplary maximum values for the timing parameters $t_1$, $t_2$, $t_3$, $t_4$ and $t_5$ in FIG. 4 are 15 ns, 15 ns, 27 ns, 27 ns and 20 ns, respectively.

FIG. 5 is a higher level timing diagram showing the relationship between transition edges in the signals CLK_8 KHZ, ILD, OLD, DO and DI. As previously noted, the 2.048 MHz data portion of serial bus 40 is divided into 32 8-bit time slots TS0 through TS31 which are signaled by both the CLK_8 KHZ and ILD/OLD signals. This relationship is illustrated in the FIG. 5 timing diagram. The load signals ILD/OLD separate the data portion of the bus into the 32 8-bit time slots as shown. Each of the 8-bit time slots carries one voice sample. For example, the above-noted time slots TS27 and TS29 may each carry a conventional 8-bit companded voice sample used to provide record and playback features. Such an 8-bit companded voice sample may be generated using well-known techniques, such as so-called A-law or $\mu$-law companding.

Figure 6:
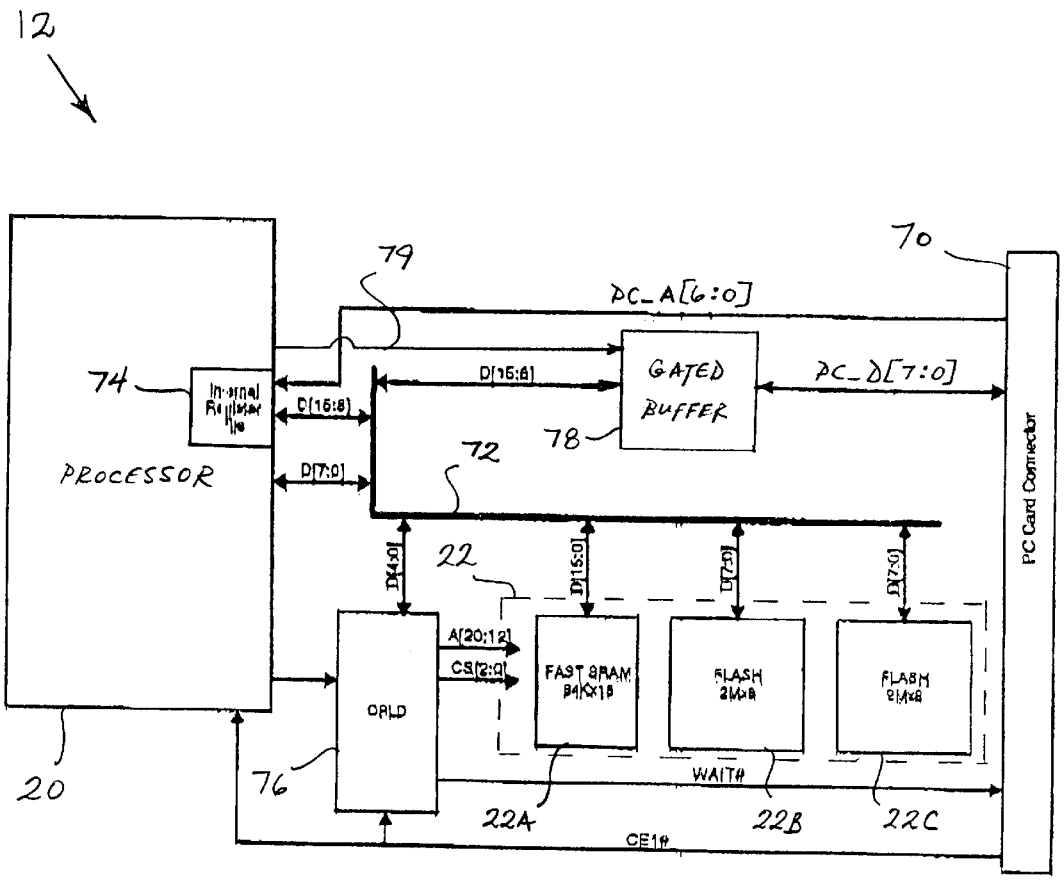
FIG. 6 is a block diagram illustrating the card portion of the voice messaging system of FIG. 1 in greater detail.

FIG. 6 is a block diagram illustrating the VM card 12 of the voice messaging system 10 of FIG. 1 in greater detail. The VM card 12 includes processor 20 and memory 22 as previously described. In this embodiment, the memory 22 includes a 64 K×16 FAST SRAM 22A and two 2M×8 FLASH memories 22B, 22C. The VM card 12 also includes a PC card connector 70 which is designed to interface with the PCMCIA socket 60 of the host system 14. The VM card 12 in this embodiment provides two ports, i.e., the ability to answer two calls simultaneously, four mail boxes, and a total of 30 minutes total voice messaging storage. The FLASH memories 22B, 22C are used to provide non-volatile storage of voice data, e.g., factory-programmed voice prompts, user-recorded announcements and user-recorded messages, and signal processing routines for the processor 20. The 64K SRAM 22A is used to buffer signal processing routines for the processor 22. A 16-bit local data bus 72 interconnects the memory 22 with the processor 20 and other elements of VM card 12. Data signals D[15:0] are supplied via bus 72 to SRAM 22A and processor 20, and data signals D[7:0] are supplied via bus 72 to the FLASH memories 22B and 22C. It should be noted that a variety of other suitable configurations of memory 22 may be used in alternative embodiments of the invention.

The processor 20 in the embodiment of FIG. 6 includes an internal 128-byte register file 74. The register file 74 includes 16 bytes of attribute memory storing a Card Information Structure (CIS), with the remaining portion of register file 74 being used to provide configuration and status registers via a memory mapped I/O interface. Both the VM card 12 and the host system 14 may use a memory-only interface when the card is first inserted, or after power has been cycled for the card. After the VM card 12 is powered up and reset is negated, the host system will read the CIS from the register file 74. After a determination has been made that the VM card 12 supports the custom serial interface previously described, the VM card 12 and the host are then configured to operate using this custom interface. Examples of status registers which may be included in the register file 74 are switch hook, i.e., on-hook/off-hook status, transfer request status, VM card status, port alert condition status, forward disconnect condition status, and real-time clock information. An exemplary configuration register in the register file 74 may include mode bits, e.g., an I/O mode bit, a compand bit, e.g., specifying either A-law or μ-law companding, "sanity" bits indicating the need for a card reset, and built-in self test (BIST) bits. The various registers of the 128-byte register file 74 are accessed using the first seven address bits A[6:0].

A simple bus arbitration circuit may be included in VM card 12 to prevent local bus collisions by forcing wait states to the host system 14 during an access to the VM card 12 when the processor 20 is driving the local bus 72. In addition, any access by the host system 14 to the VM card 12 generates an interrupt to the processor 20. This interrupt is used to guarantee that the VM Card 12 does not assert the WAITN signal for a duration greater than the maximum specified in the PCMCIA standard. The VM card 12 also includes a complex programmable logic device (CPLD) 76 which serves as an external page register suitably configured to provide address decoding and chip select functions using, e.g., address signals A[20:12] and chip select signals CS[2:0]. Data signals D[4:0] are supplied via bus 72 to the CPLD 76. The VM card 12 further includes a gated buffer 78, which, for example, allows registers in processor 20 to be connected to the host system data bus. Gated buffer 78 is controlled by a buffer gate control signal supplied via line 79. The lines designated PC_A[6:0] and PC_D[7:0] refer to card address and data lines, respectively.

Figure 7:
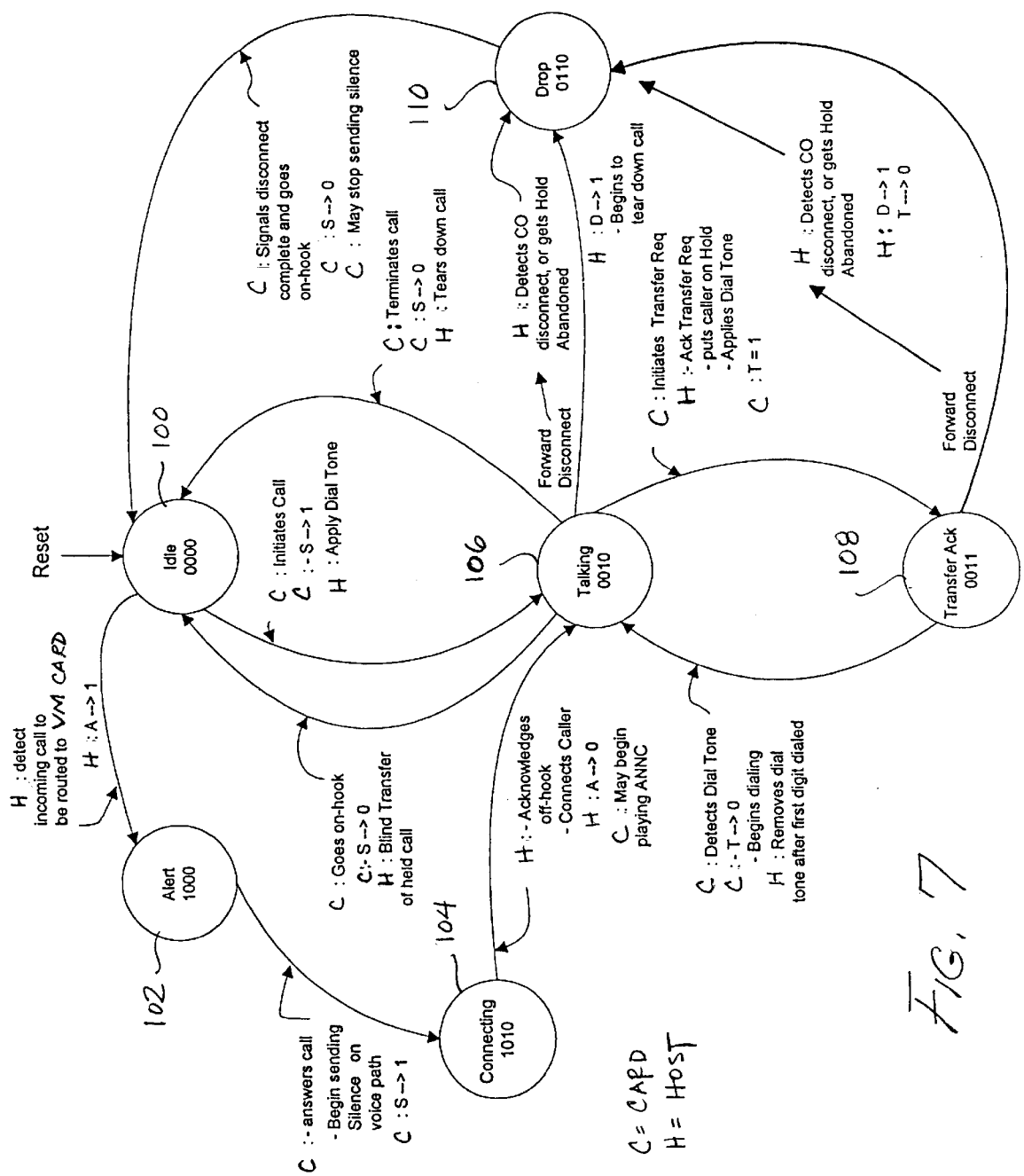
FIG. 7 is a state diagram illustrating various states and transitions in a host-card interface in the card-based voice messaging system of FIG. 1.
Figure 1:
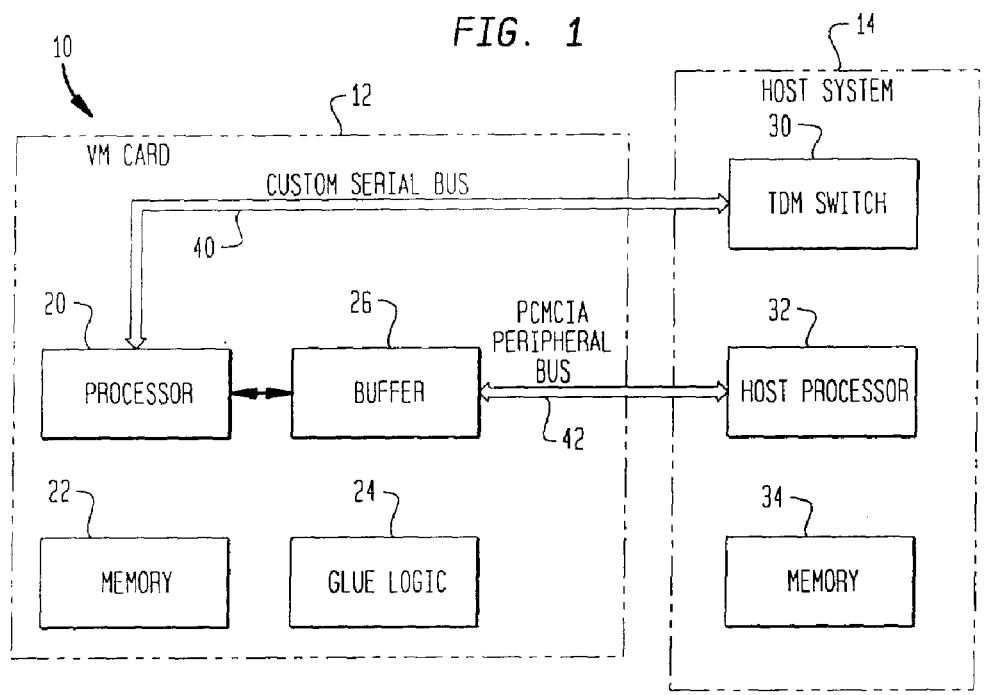
Figure 2:
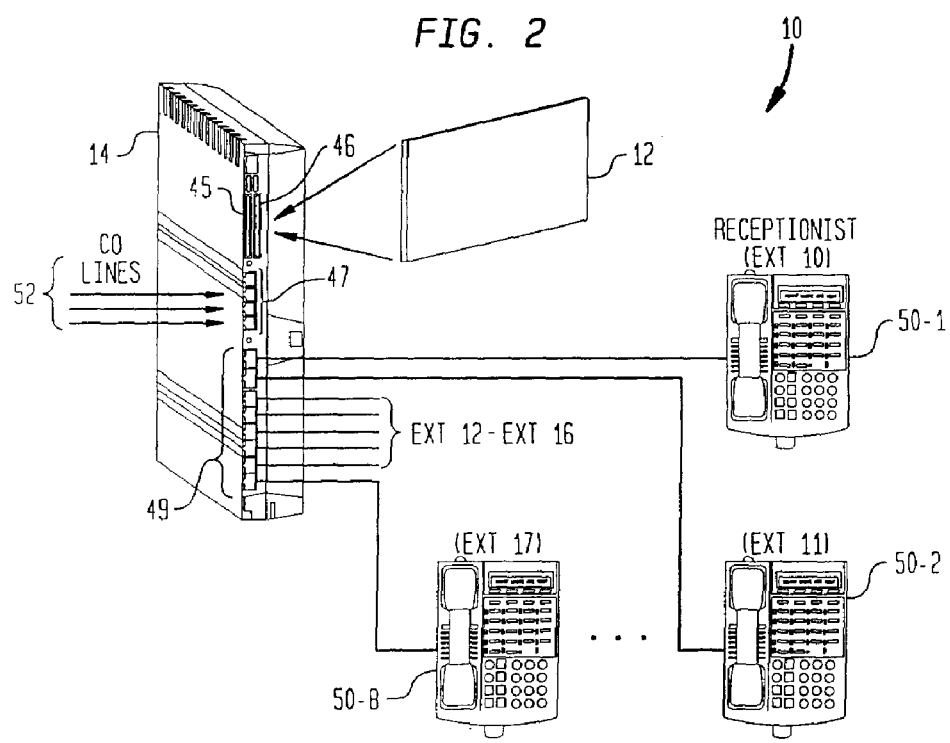
Figure 4:
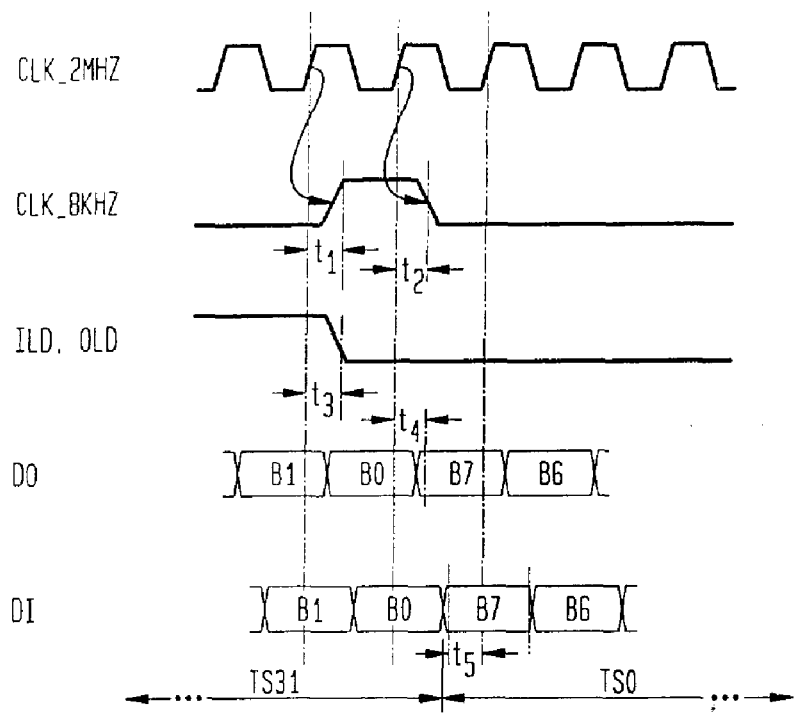
Figure 5:
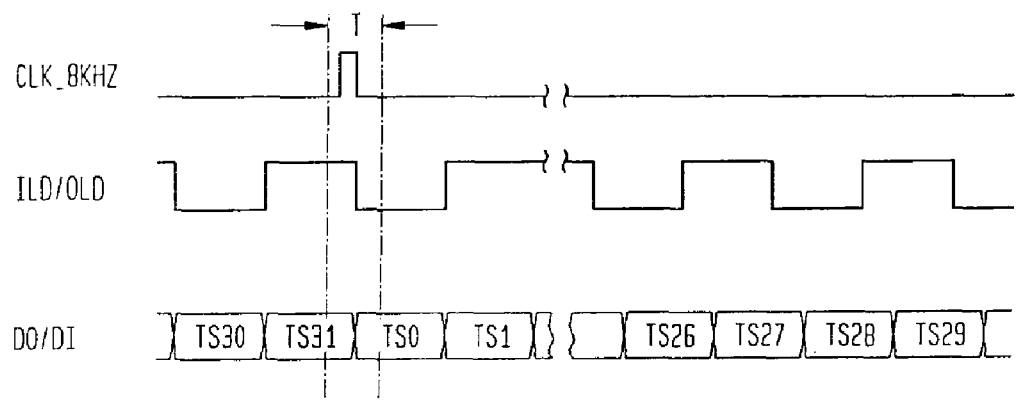
Figure 6:
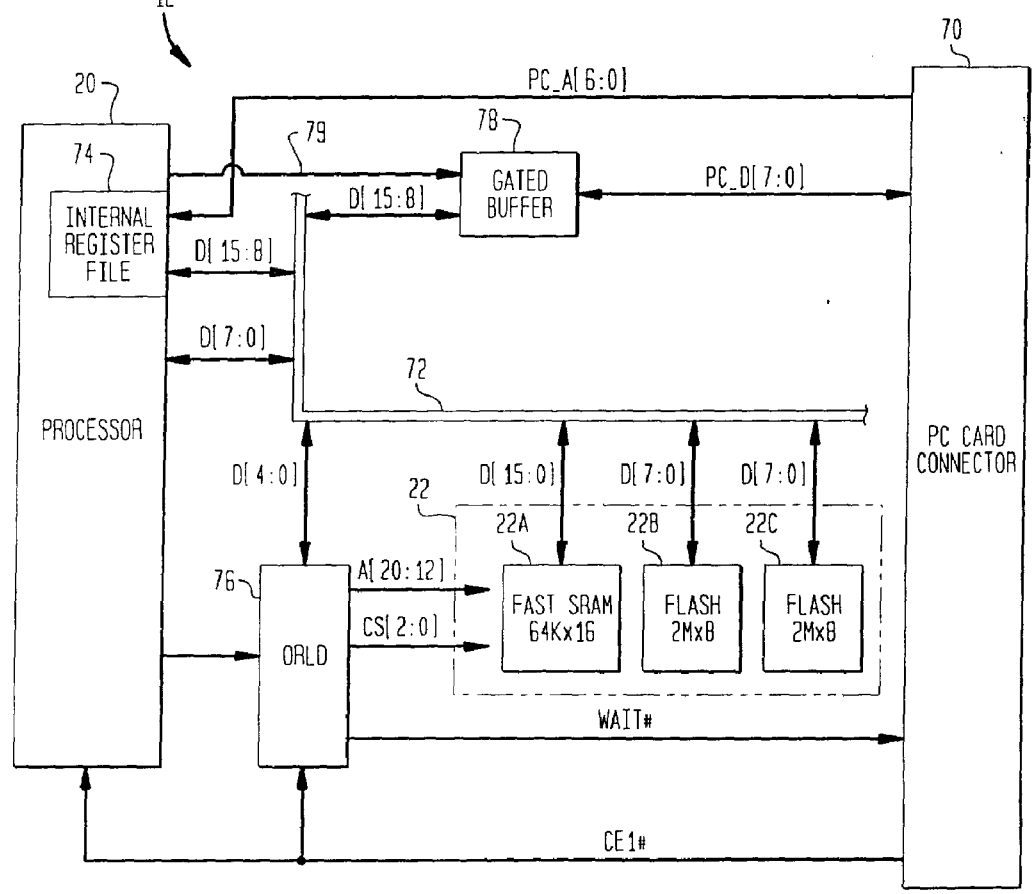

FIG. 7 is a diagram representing valid states of the interface between the VM card 12 and the host system 14, and indicates the transitions expected at that interface. The state diagram includes an Idle state 100, an Alert state 102, a Connecting state 104, a Talking state 106, a Transfer Acknowledge state 108, and a Drop state 110. Each of these states is associated in FIG. 7 with a four-bit indicator. The four bits are specified as "ADST," where A corresponds to an alert bit, D corresponds to a disconnect bit, S corresponds to a switch hook bit, and T corresponds to a transfer request bit. Bits A and D are controlled by the host processor 32 and read by the VM card 12, while bits S and T are controlled by the VM card 12 and read by the host processor 32. Each of the states in the state diagram has an indicator indicating the value of the four bits for that particular state. For example, the Alert state 102 includes an indicator "1000" indicating that the alert bit A is a logic one, while the other three bits are each a logic zero.

Upon a reset of the VM card 12, the system enters the Idle state 100. From the Idle state, the system can move to either the Alert state 102 or the Talking state 106. The system moves from Idle to Alert when the host 14 detects an incoming call to be routed to the VM card 12. The system moves from Idle to Talking when the card initiates a call, in which case the host will apply a dial tone in the voice data path. It should be noted that, in the illustrative embodiment, the card must not attempt to originate a call on a port that is alerting. The system moves from the Alert state 102 to the Connecting state 104 when the card answers a call, at which time the card begins sending "silence" over the voice data path. From the Connecting state 104, the system moves to the Talking state 106 when the host acknowledges an off-hook condition and connects the caller. At this point, the card may begin playing back a recorded announcement for the caller. From the Talking state 106, the system can return to the Idle state 100 if the card goes on-hook, thereby terminating the call. The system can also return to the Idle state 100 via the Drop state 110 if a forward disconnect signal is detected by the host.

The system can also exit the Talking state 106 if the card initiates a transfer request by asserting the T bit, i.e., the transfer request bit. This mode of exit causes the host to put the active call on hold and apply dial tone, and the system moves to the Transfer Acknowledge state 108. When the card detects dial tone, it negates the transfer request bit T, returning the system to the Talking state 106, this time with a call on hold. The card then dials the extension to which the call is to be transferred. The host removes dial tone from the VM port when it detects the first dialed digit. When the VM port has completed dialing the number, it negates the S bit, causing the host to initiate a "blind" transfer, and the system to transition to the Idle state 100. In the event that the extension to which the call was "blind" transferred is busy or does not answer, the host returns the call to the VM port which transferred it. If the call is returned, the host asserts the A bit as described previously. While the system is in the Talking state 106 or the Transfer Acknowledge state 108, if the host detects a forward disconnect signal, indicating that the held call has been abandoned, i.e., hung up, the system moves to the Drop state 110, and begins the call termination process.

From the Drop state 110, the system can return to the Idle state 100 when the card determines that the disconnect is complete and goes on-hook, at which point the card can stop sending silence over the voice data line. Note that in the illustrative embodiment, the card and the host will generally not simultaneously assert alert and disconnect. In addition, the card will generally not assert a transfer request while the switch hook bit is at a logic zero. It should also be noted that the card may begin dialing DTMF digits as soon as the dial tone is heard.

In accordance with other aspects of the invention, the VM card 12 can be configured to provide dynamic allocation of voice mail boxes and dynamic language selection. For dynamic allocation of voice mail boxes, the user is given the ability to define the number of mail boxes, i.e., voice storage bins, and the amount of storage per mail box. This may be accomplished by implementing a suitable memory allocation function in the VM card processor 20. Such a function can be implemented in a straightforward manner by one of ordinary skill in the art, and therefore will not be described in detail herein. This aspect of the invention allows users to dynamically allocate storage to match their needs, which is an important feature for solid state voice messaging systems since the cost of electronic memory is generally at a premium over traditional storage mediums, e.g., hard disk and tape.

The dynamic language selection feature of the invention allows users to select one of a set of languages that are coded into a single VM card. Once the user selects the language, the storage area that contains the rest of the undesired languages are automatically re-allocated for use as mail box storage. Again, this may be accomplished by implementing a corresponding selection function in the VM card processor 20, and the specific details of such a function are within the capabilities of one of ordinary skill in the art. This aspect of the invention provides the ability to manufacture a single card to accommodate multiple languages, instead of different cards for each language, thereby reducing the inventory that must be maintained.

The above-described embodiments of the invention are intended to be illustrative only. For example, alternative embodiments may utilize a wide variety of other communication switches or other call processing devices for supporting a card-based voice messaging system in accordance with the invention. Moreover, a voice messaging system in accordance with the invention may incorporate numerous conventional voice messaging functions and features not described herein but well known in the art. These and numerous other alternative embodiments within the scope of the following claims will be apparent to those skilled in the art.

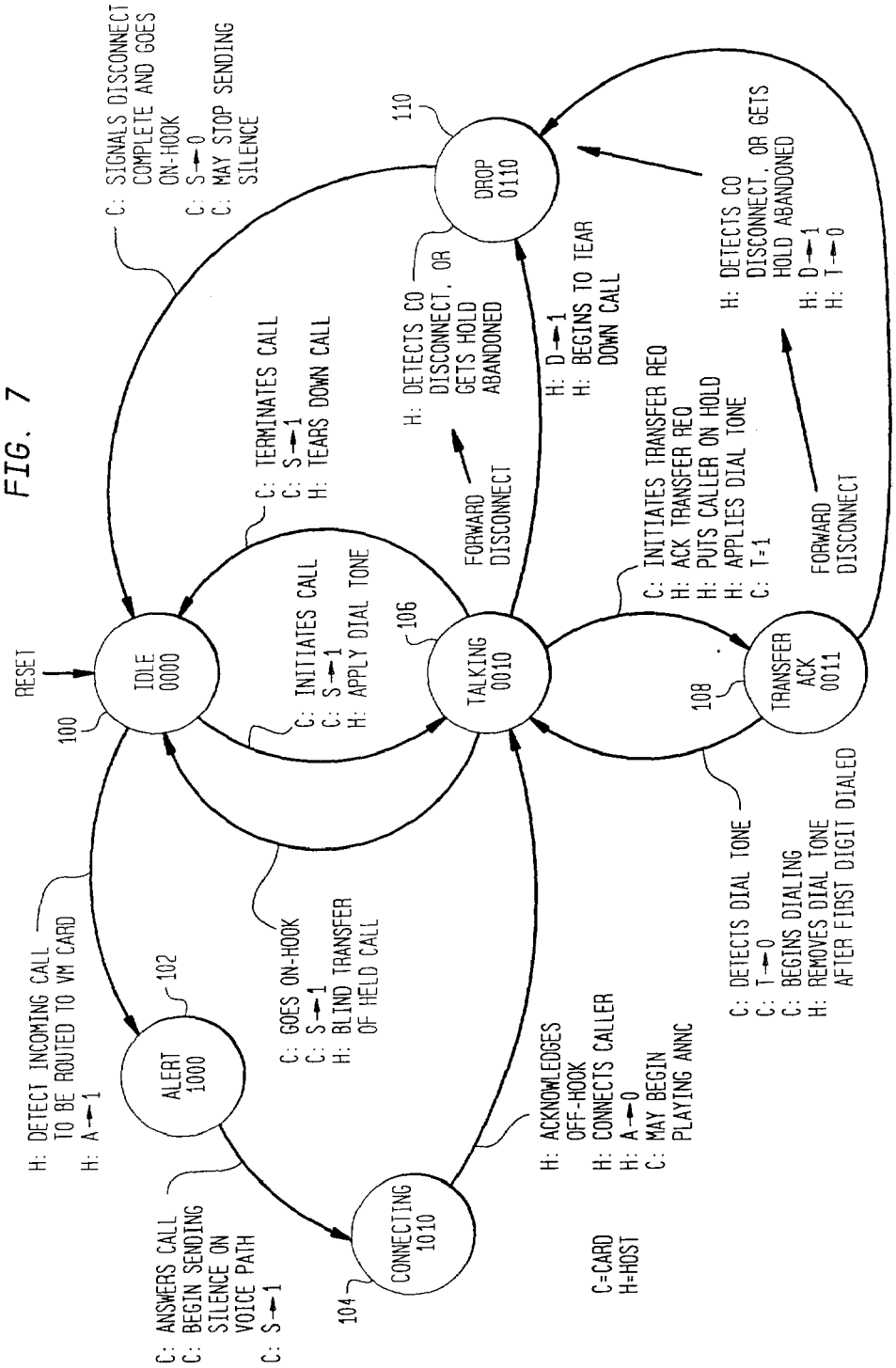

What is claimed is:

1. An apparatus for providing voice messaging functions, the apparatus comprising:

a card including a memory and a processor, the processor operative to implement at least a portion of a voice messaging system, wherein the processor associated with the card is operative to perform signal processing, application execution and file system management functions of the voice messaging system, the memory for storing voice data used in the voice messaging system; and a host call processing device comprising a communication system switch having a socket adapted to receive the card, wherein the card receives voice data from the host call processing device for storage in the memory, and delivers voice data retrieved from the memory to the host call processing device.

2. The apparatus of claim 1 wherein the card is a PCMCIA card, and the corresponding socket of the host call processing device is a PCMCIA socket.

3. The apparatus of claim 1 wherein the communication system switch comprises a private branch exchange (PBX) switch.

4. The apparatus of claim 1 wherein the card and the host call processing device communicate over a serial voice data bus.

5. An apparatus for providing voice messaging functions, the apparatus comprising:

a card including a memory and a processor, the processor operative to implement at least a portion of a voice messaging system, the memory for storing voice data used in the voice messaging system; and a host call processing device having a socket adapted to receive the card, wherein the card receives voice data from the host call processing device for storage in the memory, and delivers voice data retrieved from the memory to the host call processing device, wherein the card and the host call processing device communicate over a serial voice data bus, and wherein the serial data bus includes a time-division multiplexed voice data line divided into a plurality of time slots, each of the time slots providing a distinct voice data channel at a designated bit rate.

6. The apparatus of claim 5 wherein the serial data bus has a clock rate of about 2 MHz, and the time-division multiplexed voice data line includes 32 time slots each having a bit rate of about 64 kbps.

7. The apparatus of claim 4 wherein the serial voice data bus includes an input data line for delivering voice data from the card to the host call processing device, and an output data line for delivering output data from the host call processing device to the card.

8. The apparatus of claim 4 wherein the serial voice data bus utilizes one or more address lines of a standard interface between the card and the host call processing device.

9. An apparatus for providing voice messaging functions, the apparatus comprising:

a card including a memory and a processor, the processor operative to implement at least a portion of a voice messaging system, the memory for storing voice data used in the voice messaging system; and a host call processing device having a socket adapted to receive the card, wherein the card receives voice data from the host call processing device for storage in the memory, and delivers voice data retrieved from the memory to the host call processing device, wherein the card and the host call processing device communicate over a serial voice data bus, wherein the serial voice data bus utilizes one or more address lines of a standard interface between the card and the host call processing device, and wherein the host call processing device further includes:

a multiplexer having a first input corresponding to at least one of the address lines, a second input corresponding to at least one line of the serial bus, and an output connected to at least one connector pin of the socket; and a selection register having an output coupled to a select signal input of the multiplexer, such that the multiplexer is operative to deliver either the first input or the second input of inputs to the card via the socket based on the contents of the selection register.

10. The apparatus of claim 1 wherein the processor associated with the card is further operative to implement a memory allocation function which allows a user to define at least one of (i) a number of voice mail boxes supported by the voice messaging system, and (ii) a portion of the memory which is allocated to each of the voice mail boxes.

11. The apparatus of claim 1 wherein the processor associated with the card is further operative to implement a language selection function which allows a user to select one of a set of languages that are supported by the voice messaging system.

12. The apparatus of claim 11 wherein the memory associated with the card stores information in each of the set of languages, and wherein when the user selects a given one of the languages, a portion of the memory that contains information in unselected languages is automatically re-allocated for use as voice mail box storage.

13. An apparatus for providing voice messaging functions, the apparatus comprising:

a card including a memory and a processor, wherein the processor associated with the card is operative to perform signal processing, application execution and file system management functions of the voice messaging system, the memory for storing voice data used in the voice messaging system;

wherein the card is insertable into a socket of a host call processing device comprising a communication system switch and adapted to receive the card, such that the card receives voice data from the host call processing device for storage in the memory, and delivers voice data retrieved from the memory to the host call processing device.

14. An apparatus for providing voice messaging functions, the apparatus comprising:

a host call processing device comprising a communication system switch and having a socket adapted to receive a card, the card including a memory and a processor, wherein the processor associated with the card is operative to perform signal processing, application execution and file system management functions of the voice messaging system, and the memory storing voice data used in the voice messaging system;

wherein the card receives voice data from the host call processing device for storage in the memory, and delivers voice data retrieved from the memory to the host call processing device.

15. A method of implementing a voice messaging system, the method comprising the steps of:

incorporating at least a portion of the voice messaging system into a card having a memory and a processor, wherein the processor associated with the card is operative to perform signal processing, application execution and file system management functions of the voice messaging system; and adapting the card for insertion into a socket of a host call processing device comprising a communication system switch, such that the card is operative to receive voice data from the host call processing device for storage in the memory, and to deliver voice data retrieved from the memory to the host call processing device.

16. The method of claim 15 further including the step of configuring the card to communicate with the host call processing device over a serial voice data bus.

17. A method of implementing a voice messaging system, the method comprising the steps of:

incorporating at least a portion of the voice messaging system into a card having a memory and a processor; and adapting the card for insertion into a socket of a host call processing device, such that the card is operative to receive voice data from the host call processing device for storage in the memory, and to deliver voice data retrieved from the memory to the host call processing device, further including the step of configuring the serial data bus to include a time-division multiplexed voice data line divided into a plurality of time slots, with each of the time slots providing a distinct voice data channel at a designated bit rate.

18. The method of claim 16 wherein the serial voice data bus utilizes one or more address lines of a standard interface between the card and the host call processing device.

19. The method of claim 15 further including the step of implementing a memory allocation function which allows a user to define at least one of: (i) a number of voice mail boxes supported by the voice messaging system, and (ii) a portion of the memory which is allocated to each of the mail boxes.

20. The method of claim 15 further including the step of implementing a language selection function which allows a user to select one of a set of languages that are supported by the voice messaging system.

21. The method of claim 20 wherein the memory associated with the card stores information in each of the set of languages, and further including the step of, when the user selects a given one of the languages, automatically reallocating a portion of the memory that contains information in unselected languages for use as voice mail box storage.

22. A method of implementing a voice messaging system, the method comprising the steps of:

configuring the system to utilize a host call processing device comprising a communication system switch in conjunction with a card having a memory and a processor wherein the processor associated with the card is operative to perform signal processing, application execution and file system management functions of the voice messaging system; and adapting the host call processing device to include a socket for receiving the card, such that the host call processing device is operative to receive voice data retrieved from the memory of the card, and to deliver voice data to the card for storage in the memory.

23. The method of claim 22 further including the step of configuring the host call processing device to communicate with the card over a serial voice data bus.

24. A method of implementing a voice messaging system, the method comprising the steps of:

configuring the system to utilize a host call processing device in conjunction with a card having a memory and a processor; and adapting the host call processing device to include a socket for receiving the card, such that the host call processing device is operative to receive voice data retrieved from the memory of the card, and to deliver voice data to the card for storage in the memory, further including the step of configuring the host call processing device to communicate with the card over a serial voice data bus, further including the step of configuring the serial data bus to include a time-division multiplexed voice data line divided into a plurality of time slots, with each of the time slots providing a distinct voice data channel at a designated bit rate.

25. The method of claim 23 wherein the serial voice data bus utilizes one or more address lines of a standard interface between the card and the host call processing device.

26. The method of claim 22 further including the step of implementing a memory allocation function which allows a user to define at least one of: (i) a number of voice mail boxes supported by the voice messaging system, and (ii) a portion of the memory which is allocated to each of the voice mail boxes.

27. The method of claim 22 further including the step of implementing a language selection function which allows a user to select one of a set of languages that are supported by the voice messaging system.

28. The method of claim 27 wherein the memory associated with the card stores information in each of the set of languages, and further including the step of, when the user selects a given one of the languages, automatically reallocating a portion of the memory that contains information in unselected languages for use as voice mail box storage.

* * * * *

UNITED STATES PATENT AND TRADEMARK OFFICE
CERTIFICATE OF CORRECTION

PATENT NO.     : 6,452,937 B1
DATED          : September 17, 2002
INVENTOR(S)    : Lee Edward Borkovic et al.

It is certified that error appears in the above-identified patent and that said Letters Patent is hereby corrected as shown below:

Drawings,
Delete Drawing Sheets 1,3-5 and insert the attached Drawing Sheets 1,3-5.

Signed and Sealed this

Twenty-second Day of October, 2002

Attest:

JAMES E. ROGAN
Director of the United States Patent and Trademark Office

Attesting Officer